United States Patent Office 3,446,705
Patented May 27, 1969

3,446,705
METHOD FOR THE PRODUCTION OF 6-AMINO-PENICILLANIC ACID
Leon John Heuser, Robbinsville, Ching Chiang, Highland Park, and Carl Francis Anderson, Milltown, N.J., assignors to E. R. Squibb & Sons, Inc., New York, N.Y., a corporation of Delaware
No Drawing. Filed Mar. 30, 1967, Ser. No. 626,990
Int. Cl. C07c 99/14
U.S. Cl. 195—36        5 Claims

ABSTRACT OF THE DISCLOSURE

A process for the production of 6-aminopenicillanic acid comprising hydrolyzing a compound of the penicillin series by adsorbing a penicillin splitting enzyme (which has been preferably freed of fermentation solids) on bentonite, contacting the penicillin with the adsorbed enzyme in aqueous medium at a pH of about 7.0 to 9.0 and maintaining that pH during the entire hydrolysis period with aqueous ammonia or amine. The resulting 6-aminopenicillanic acid may then be acylated to form other members of the penicillin series and the clay adsorbate may be repeatedly reused.

---

There are a number of antibacterial agents in the penicillin series which are characterized by varying substituents coupled to a basic 6-aminopenicillanic acid (6-APA) moiety. These are frequently obtained by cleaving a readily produced penicillin such as penicillin G to obtain the 6-aminopenicillanic acid portion and this then is acylated with an appropriate acylating agent to couple the new side chain or substituent to the amino group in the 6-position. This procedure permits the replacement of the substituent group in the original penicillin with a new group thereby modifying the penicillin molecule so as to obtain a wide variety of so-called semi-synthetic antibiotics having altered spectra of activity and other modified properties. Thus for example, penicillin G, which is readily and cheaply produced by microbial fermentation from *Penicillium chrysogenum*, may be converted by this approach to α-phenoxyethyl penicillin (phenethicillin), 5-methyl-3-phenyl-4-isoxazolylpenicillin (oxacillin), dimethoxyphenyl penicillin (methicillin), etc.

6-APA may be derived enzymatically from the penicillin compound used as a source by treating that source material with an enzyme effective in hydrolyzing or splitting the starting material into its 6-APA portion and acid portion. The enzymatic hydrolysis procedure usually comprises adding the penicillin source material in salt form directly to the culture broth in which the enzyme has been produced or to the supernatant liquid, containing most of the enzyme, obtained by centrifuging the fermentation broth so as to remove most of the solid portion.

The large scale practice of this hydrolysis procedure, i.e., on a scale in excess of the 500 ml. or one liter quantities used in the laboratory, and especially on the large tank scale used commercially, usually results in yields of the desired hydrolysis product considerably below the theoretical. Moreover, the isolation of the hydrolysis product from the enzyme and other residue involves many difficulties.

It has been found that the conversion (hydrolysis) of the penicillin and the recovery of the product may be greatly enhanced by observing three conditions, each of which adds to the yield and increases the amount of penicillin which can be hydrolyzed by a given amount of enzyme activity. First, the penicillin should be contacted with the enzyme separately from the fermentation broth in which the latter is produced. Secondly, the enzyme should be adsorbed on a bentonite for contact with the penicillin. Third, the hydrolysis should be effected in an alkaline medium in which ammonia or a primary, secondary or tertiary acyclic amine is the basic agent instead of an inorganic base such as sodium hydroxide.

The process of this invention then comprises the enzymatic hydrolysis of a penicillin by contacting the penicillin in aqueous medium with an amidase, which has been separated from its broth and adsorbed on bentonite, while maintaining a pH preferably about 7.0 to 9.0 with ammonia or an amine.

The process of this invention may be applied to any antibiotic of the penicillin series including, for example, penicillin G, penicillin V, penicillin O, penicilln F, phenethicillin, 2-(phenylthio)ethylpenicillin, etc. The resulting hydrolysis product may then be converted to a new antibiotic by conventional acylating procedures.

An enzyme, derived from any source, primarily the extra-cellular variety, which is capable of hydrolyzing or splitting the antibiotic of the penicillin series into its 6-APA moiety (or simple derivative, such as a metal salt or the desacetyl analog) may be used, e.g., penicillin acylase (penicillin amidase). Such enzymes may be obtained from microorganisms such as those of the genera Brevibacterium, Achromobacterium, Flavobacterium, Penicillin, Bacillus, Escherichia, Alcaligenes, Streptomyces, Bacterium, Aerobacter, Micrococcus, Mycobacterium, e.g., *Penicillium chrysogenum, Bacterium cyclooxydans, Aerobacter cloaceae, Bacillus subtilis, Bacillus megaterium, Micrococcus lysodeikticus, Mycobacterium phlei, Alcaligenes faecalis, Streptomyces nourseii, Streptomyces griseus*, etc., or may be derived from crude plant proteinases, e.g., papain.

The hydrolyzing enzyme may be obtained by culturing the producing microorganism under aerobic conditions in a suitable nutrient medium containing a source of nitrogenous factors, an assimilable source of carbon and energy under the conditions described in U.S. Patent 3,144,395, Aug. 11, 1964.

The fermentation broth containing the hydrolyzing enzyme is centrifuged, for example, in a high speed desludging centrifuge, e.g., operating at about 4000 to 8000 r.p.m., to remove the bulk of the solids.

The liquid portion from which the solids have been removed, is admixed with a finely divided bentonite on which the enzyme is adsorbed. A bentonite 30 to 40 mesh size or smaller is preferred. Naturally occurring bentonites and processed bentonites available commercially under trade names such as Albagel, Macaloid, as well as synthetic bentonites may be used.

Optimally, the clay may be used in admixture with a filter aid such as Hyflo. The amount of clay used is about 5 to 20 kg. of clay per 1000 l. of enzyme. Approximately the same amount of filter aid is combined with the clay if its use is desired to increase the filtration rate. The adsorption of the enzyme on the clay is preferably effected in an aqueous medium, using a small amount (0.1–0.5%) of an organic solvent such as toluene as a bactericide. The pH of the liquid mixture should be maintained at about 6.5 to 9, preferably pH 7.0 to 8.0. After agitating for about an hour or more, the mixture is filtered. The filter cake contains the enzyme adsorbed on the clay.

The filter cake is slurried in water, preferably containing a small amount of an inert organic solvent referred to above as a bactericide, and hydrolysis is effected by adding the penicillin to the slurry. The penicillin is preferably employed in the form of a salt, e.g., an alkali metal or alkaline earth metal salt, usually the sodium or potassium salt. The hydrolysis is best effected at a pH of about 7.0 to 9.0, preferably 8.0 to 8.5 and especially 8.0 to 8.2, being controlled by addition of ammonia or an amine and at a temperature from ambient to about 45°, e.g., about 18 to 45° C. The hydrolysis generally is complete in about 2 to 15 hours.

An aqueous ammonia or amine solution of about 5 to 29% concentration, preferably about 10%, is used. The amines are preferably acyclic organic amines such as alkylamines, e.g., methylamine, ethylamine, diethylamine, triethylamine, etc., alkanolamine and the like.

An alkaline earth metal ion may be present to help coagulate broth solids. The calcium ion is preferred, although barium, magnesium and the other alkaline earth metals may be used. The metal ion is added in the form of its salt, preferably inorganic salt such as calcium chloride, barium nitrate, magnesium chloride or the like. About 0.1 to 2.0% preferably 0.1 to 0.5% by weight of the salt (based on the enzyme broth volume) may be present.

The hydrolysate is filtered and the hydrolysis product is isolated. A relatively clean hydrolysate is thus produced and the product is readily isolated by any of several procedures, e.g., by forming an insoluble Schiff's base, for example with salicylaldehyde and an amine salt or by extracting at acid pH with an organic solvent to remove impurities and concentrating, if necessary, to a suitable volume for crystallization of the 6–APA.

The procedure described above provides the advantages of readily isolating the enzyme from the fermentation broth, giving an adsorption product, a form in which the readily inactivated enzyme is in a stable form that can be stored and used when desired, the proportion of enzyme to starting material may be varied to give >90% conversions in a large scale operation at relatively high concentrations in water and a relatively clean hydrolysate from which the product may be readily isolated. The 6–APA is obtained in good yield and may be reacted with an acylating agent in conventional manner to obtain any penicillin derivative. The enzyme adsorbate is stable and may be reused repeatedly.

The following examples are illustrative of the invention. All temperatures are in degrees centigrade.

EXAMPLE 1

(a) 110 liters of the following aqueous sterile medium: 3.0% amber enzyme hydrolyzed casein, 0.05% Ucon lubricant LB 625 and 0.5% glucose (separately sterilized), the pH adjusted to 7.0 before and after sterilization for 30 minutes at 121° is inoculated with 3.4 liters of a culture of Bacillus megaterium ATCC 14945 which has been grown at 30° to 24 hours in the following medium: 4.0% Amber enzyme hydrolyzed casein, 0.5% Ucon lubricant LB 625 and 0.5% glucose, the pH adjusted to 7.0 before and after sterilization for 30 minutes at 121°. The resulting mixture is agitated (0.2 H.P./100 gal.) and aerated for 48 to 72 hours. After about 8 hours 0.15% phenylacetic acid is added.

(b) To the whole broth is added 0.5% v./v. Primafloc C–3 (a flocculating agent) as a 30% solution 0.2% toluene v./v. and the mixture is centrifuged at room temperature in a desludging centrifuge at a pH of 7.0 to 7.5.

(c) To 100 l. centrifugate layered with 200 ml. toluene is added 300 g. $CaCl_2$ with agitation at room temperature. After solution, a mixture of 1 kg. bentonite (U.S.P.) and 1 kg. Hyflo is added. The pH is adjusted to 6.2–6.3 with concentrated $HNO_3$ and agitation continued for 1 hour at room temperature maintaining a pH of 6.2–6.3. The mixture is then filtered on a Hyflo precoated Eimco filter. During filtration the cake is washed with 7–5 l. 0.5% aqueous $CaCl_2$ solution.

(d) The wet cake from the filtration contains the penicillin acylase adsorbed on bentonite. This cake is slurried in a mixture of 40 l. $H_2O$ and 100 ml. toluene and the pH adjusted to 8.0–8.2 with 10% $NH_4OH$. After warming to 27–29° C., a solution of 300 kg. of potassium penicillin G in 300 gal. of water is added. Hydrolysis is continued at this temperature and pH by heating as necessary and using 10% aqueous ammonia for pH control (automatic pH controller). The end of the reaction (about 15 hours) is determined by 100% theoretical alkali consumption. The reaction mixture is then cooled to room temperature and the pH adjusted to 6.3 with concentrated $HNO_3$. After 1 hr. agitation at pH 6.3, the hydrolysate is filtered and washed with 10 l. $H_2O$.

(e) To the filtered hydrolysate is added ⅓ volume of isobutylacetate and the mixture cooled to 5–10° C. After pH adjustment to 2.0–2.2 with concentrated $NHO_3$, the mixture is agitated 15 minutes and separated by centrifugation. A small amount of solid precipitates and is removed by centrifuging. The rich aqueous solvent is then neutralized to pH 7.2–7.4 with 50% NaOH.

(f) The neutralized solution is concentrated in the flash evaporator under vacuum (T<40° C.) to 5–6 liters. Crystallization is carried out by acidifying the solution with concentrated $HNO_3$ over a period of 1 hour to pH 3.8–4.0. After an additional 3 hours agitation at room temperature, the crystals are filtered and washed portionwise with 1.5 l. $H_2O$ followed by 1.5 l. acetone. The product, 6-aminopenicillanic acid, is then dried under vacuum at 40° C.

EXAMPLE 2

(a) 1100 gal. of medium is prepared as in Example 1a and Bacillus megaterium ATCC 14945 is cultured in the same manner.

(b) At 70–72 hours, the broth is harvested and cooling to 15° C. is started. Primafloc C–3 (flocculating agent 0.3% v./v.) is added followed by $CaCl_2$ (0.5% wt./vol.). The batch is then adjusted to pH 7.0–7.2 with 20% $H_2SO_4$ and agitated for 1 hour under a toluene and nitrogen overlay. The broth is then centrifuged to remove broth solids. To 1000 gal. of clarified broth is added 137.8 kg. of Hyflo (1.5%) followed by 137.8 kg. of (1.5%) bentonite. The adsorption is carried out with agitation at pH 7.0–7.2 for 1 hour. 500 gal. water is added and after 30 minutes agitation, the slurry is allowed to settle for 2 hours and the wash decanted. The residual slurry is then centrifuged and washed with water (10% of the slurry vol.). The rich enzyme cake is held cold (5–10° C.) with a toluene overlay.

(c) The rich enzyme cake from b is slurried in 1760 gal. of water (6650 l.), the slurry is adjusted to pH 8.0–8.2 with 10% $NH_4OH$, and the mixture heated to 27–29° C. 300 kg. of penicillin G (45 g./liter) is added and the hydrolysis is carried out at the same temperature for 16 hours using 10% $NH_4OH$ to maintain pH. The hydrolysate is centrifuged and washed with 10% (665 l.) of the original make up water. The centrifuged and washed hydrolysate is then cooled and processed as in Examples 1e and f to obtain crystalline 6–APA.

EXAMPLE 3

By following the procedure of Example 2, but using potassium penicillin V instead of potassium penicillin G and enzyme derived from Streptomyces griseus, 6-aminopenicillanic acid is obtained.

EXAMPLE 4

By following the procedure of Example 2, but utilizing in parts (a) and (b) penicillin acylase enzyme derived from Streptomyces noursei instead of the penicillin acylase obtained in part (a) of that example and triethylamine instead of ammonia to maintain pH, 6-aminopenicillanic acid is obtained.

What is claimed is:
1. A process for the hydrolysis of an antibacterial agent of the penicillin series which comprises contacting said penicillin with an enzyme capable of splitting said penicillin in an aqueous medium free of fermentation solids at a pH of about 7.0 to 9.0 and maintaining said pH with ammonia or an acyclic organic amine.

2. In a process for the production of 6-aminopenicillanic acid by enzymatic hydrolysis of an antibiotic of the penicillin series, the improvement which comprises adsorbing the enzyme on bentonite, contacting the antibiotic with the enzyme-containing bentonite in aqueous medium at a pH of about 7.0 to 9.0 and maintaining said pH with ammonia or acyclic organic amine.

3. A process as in claim 2 wherein the enzyme has been freed of fermentation solids prior to absorption on bentonite and the pH is maintained with aqueous ammonia.

4. A process as in claim 2 wherein penicillin acylase, freed of fermentation solids, is adsorbed on bentonite and the penicillin is contacted with the acylase-containing bentonite in aqueous ammonia medium.

5. A process as in claim 2 wherein penicillin acylase is adsorbed on bentonite, penicillin G is hydrolyzed with the acylase containing bentonite at a pH of about 8.0 to 8.2 and said pH is maintained with aqueous ammonia until hydrolysis has been completed.

References Cited

UNITED STATES PATENTS 3,297,546  1/1967  Johnson et al. _____ 195—36

A. LOUIS MONACELL, *Primary Examiner.*

J. L. WINDE, *Assistant Examiner.*